No. 890,688. PATENTED JUNE 16, 1908.
S. McBRIDE.
SPOOL HOLDER.
APPLICATION FILED NOV. 15, 1906.
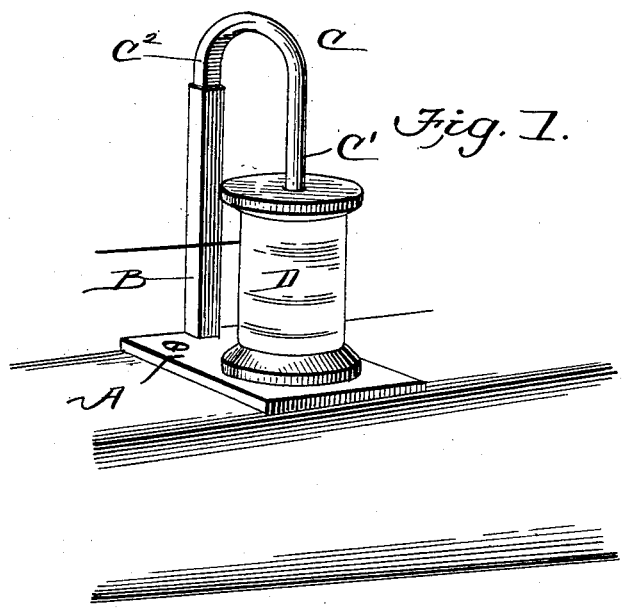
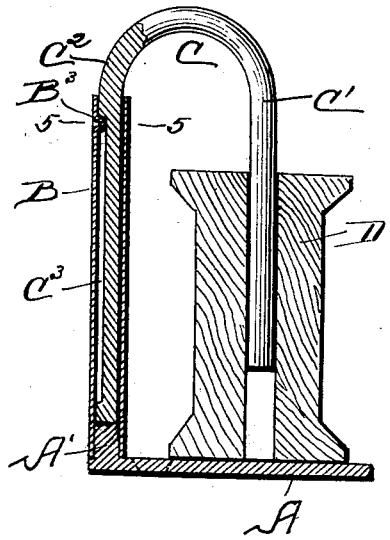
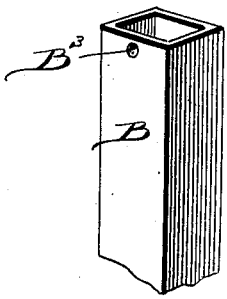
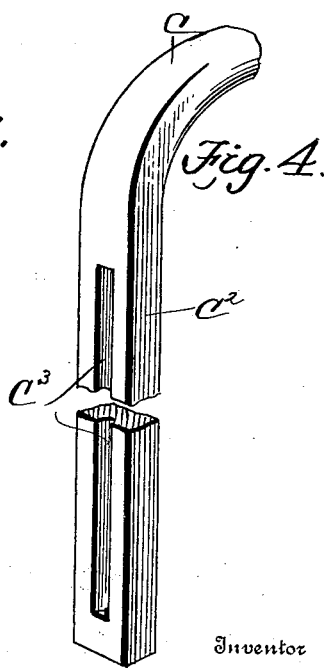
Witnesses
Inventor
Sarah McBride.
By O'mand Brock
Attorney

UNITED STATES PATENT OFFICE.

SARAH McBRIDE, OF LOUISVILLE, KENTUCKY.

SPOOL-HOLDER.

No. 890,688.  Specification of Letters Patent.  Patented June 16, 1908.

Application filed November 15, 1906. Serial No. 343,590.

*To all whom it may concern:*

Be it known that I, SARAH McBRIDE, a citizen of the United States, residing at Louisville, in the county of Jefferson and State of Kentucky, have invented a new and useful Improvement in Spool-Holders, of which the following is a specification.

This invention relates generally to spool holders arranged upon the arm of the sewing machine, the object being to provide a cheap, simple and efficient device by means of which the spool can be quickly arranged upon the arm or removed as desired, and one in which the spool will be held in one position with relation to the arm of the sewing machine, but permitted to turn freely for the purpose of unraveling the thread.

With these objects in view the invention consists in the special features of construction hereinafter fully described and pointed out in the claim.

In the drawings forming part of this specification Figure 1 is a perspective view of a spool holder constructed in accordance with my invention; Fig. 2 is a vertical sectional view of the same; Fig. 3 is a detail perspective view of the rectangular shaped tube; Fig. 4 is a detail perspective view showing a portion of the spool holding arm and, Fig. 5 is a sectional view on the line 5—5 of Fig. 2.

In constructing a spool holder in accordance with my invention I employ a flat plate A, which is formed with a rectangular shaped boss A' near one edge thereof and rigidly connected to this boss is a tube B rectangular in cross section and adapted to fit snugly upon the rectangular shaped piece and to which it is rigidly connected in any suitable manner. The spool holding arm C is in the shape of an inverted U, and comprises the round member C' while the member $C^2$ is rectangular in cross section and is adapted to slide freely up and down in the rectangular shaped tube B. The member C' is intended to fit down into the circular bore of the spool D and it will be noted that this member is slightly shorter than the member $C^2$ so that the arm can be raised and the member C' entirely removed from the spool without disengaging the member $C^2$ from the tube B and in order to prevent the arm being pulled completely out of the tube, I construct the arm with a longitudinal groove $C^3$ which extends nearly to the lower end of the same and after the said arm is arranged in the tube the tube is punched inwardly near its upper end as shown at $B^3$, thereby serving both as a guide and a stop to limit the upward movement of the member C. By having the tube B and arm rectangular in cross section all tendency of the spool holder to turn is entirely avoided and the spool is, therefore, free to rotate at all times upon the rounded member C'.

It will thus be seen that I provide a spool holder capable of carrying out all of the objects hereinbefore referred to.

Having thus described my invention what I claim as new and desire to secure by Letters Patent is—

A spool holder comprising a plate provided with an upwardly projecting rectangular shaped boss adjacent one end, and a rectangular shaped tube secured over said boss an inverted U-shaped arm having a rectangular shaped member provided with a longitudinal groove arranged in said tube, said tube being punched inwardly at its upper end to form a stop, as and for the purpose set forth.

SARAH McBRIDE.

Witnesses:
FRANCES GRIGSBY,
DALLAS E. FURLONG.